US012734550B2

(12) United States Patent
Kar

(10) Patent No.: US 12,734,550 B2
(45) Date of Patent: Sep. 15, 2026

(54) PARTICLE FILTRATION SYSTEM

(71) Applicant: Aiko.AI, Inc., San Francisco, CA (US)

(72) Inventor: Siddharth Sandipan Kar, San Francisco, CA (US)

(73) Assignee: Aiko.AI, Inc., San Francisco, CA (US)

( * ) Notice: Subject to any disclaimer, the term of this patent is extended or adjusted under 35 U.S.C. 154(b) by 0 days.

(21) Appl. No.: 19/114,542

(22) PCT Filed: Oct. 2, 2023

(86) PCT No.: PCT/US2023/075746

§ 371 (c)(1),
(2) Date: Mar. 24, 2025

(87) PCT Pub. No.: WO2024/076933

PCT Pub. Date: Apr. 11, 2024

(65) Prior Publication Data

US 2025/0381584 A1 Dec. 18, 2025

Related U.S. Application Data

(60) Provisional application No. 63/378,409, filed on Oct. 5, 2022.

(51) Int. Cl.
*B07B 4/02* (2006.01)
*B07B 11/02* (2006.01)
(Continued)

(52) U.S. Cl.
CPC .............. *B07B 4/025* (2013.01); *B07B 11/02* (2013.01); *B07B 11/04* (2013.01); *B07B 11/06* (2013.01)

(58) Field of Classification Search
CPC ........... B07B 4/02; B07B 4/025; B07B 11/04; B07B 11/06; B07B 13/08
(Continued)

(56) References Cited

U.S. PATENT DOCUMENTS 1,420,593 A 6/1922 Titchmarsh
4,759,840 A * 7/1988 McIntyre .................. B07B 4/02
209/147
(Continued)

FOREIGN PATENT DOCUMENTS

CN 109998147 A * 7/2019 ............. B07B 11/04
CN 110665807 A * 1/2020 ............. B07B 11/02
(Continued)

OTHER PUBLICATIONS

Feng; Jingjing, "Garbage Winnowing Method, Control System and Storage Medium" (English Translation), Sep. 3, 2021, worldwide. espacenet.com (Year: 2021).*
(Continued)

*Primary Examiner* — Molly K Devine
(74) *Attorney, Agent, or Firm* — Almanac IP Advisors LLP

(57) ABSTRACT

An air-based particle filtration system (10) having at least one fan (26) to filter particles (especially coffee grinds) based on weight. The particle filtration system (10) includes a chamber (44) and a hopper (12) for dispersing particles to be sorted into the chamber. The particle filtration system (10) has a controller driving the one or more fans (26) and a collector (36) for conforming particles and optionally a discard collector (38) for non-conforming particles.

17 Claims, 9 Drawing Sheets

(51) Int. Cl.
*B07B 11/04* (2006.01)
*B07B 11/06* (2006.01)

(58) Field of Classification Search
USPC ................................ 209/135, 142, 146, 154
See application file for complete search history.

(56) References Cited

U.S. PATENT DOCUMENTS

| | | | | |
|---|---|---|---|---|
| 5,494,171 | A * | 2/1996 | Kazamoto | B29B 9/16<br>209/127.4 |
| 2018/0055289 | A1 * | 3/2018 | Al-Shaibani | B07B 1/42 |
| 2020/0108413 | A1 | 4/2020 | Bierma et al. | |

FOREIGN PATENT DOCUMENTS

| | | | | |
|---|---|---|---|---|
| CN | 113333287 | A * | 9/2021 | B07B 11/04 |
| EP | 3542913 | A1 | 9/2019 | |
| KR | 20120052617 | A | 5/2012 | |
| SU | 713616 | A1 | 2/1980 | |
| WO | 2015073732 | A1 | 5/2015 | |
| WO | 2018044845 | A1 | 3/2018 | |

OTHER PUBLICATIONS

Wu; Huanhuan, "Screening Device and Metal Powder Screening Method" (English Translation), Jan. 10, 2020, worldwide.espacenet.com (Year: 2020).*

Wu; Ping, "A Pneumatic Tobacco Debris Removal System" (English Translation), Jul. 12, 2019, worldwide.espacenet.com (Year: 2019).*

PCT Search Report for Int'l Appl. No. PCT/US2023/075746 mailed Feb. 12, 2024 (5 pages).

PCT Written Opinion of the ISA for Int'l Appl. No. PCT/US2023/075746 mailed Feb. 12, 2024 (8 pages).

Peng et al., "Airflow Velocity Designing for Air Classifier of Manufactured Sand Based on CPFD Method," Minerals 2022, 12, 90. https://doi.org/10.3390/min12010090, published Jan. 13, 2022.

* cited by examiner

PARTICLE FILTRATION SYSTEM

CROSS-REFERENCE TO RELATED APPLICATION

The present application is the National Stage of International Application No. PCT/US2023/075746, filed Oct. 2, 2023, which claims priority to U.S. Provisional Application Ser. No. 63/378,409 filed Oct. 5, 2022, the disclosure of which is incorporated by reference herein for all purposes.

BACKGROUND

Field of the Disclosure

This disclosure generally relates to ground coffee and a particle filtration system for separating ground coffee particles to improve brewing outcomes.

Background

Preparing good coffee is frequently thought of as an art form. That is a regrettable misconception because it falsely elevates what should be an easily accessible and repeatable process into an esoteric one, which in turn underserves the hundreds of millions of people around the world who appreciate coffee and deserve to experience the full breadth of experience which any well roasted coffee bean promises to provide.

Coffee making is, in fact, but a science—a simple one, that is governed by the simplest laws of chemistry and physics. With quality ingredients and an adherence to the correct proportions and preparations, every cup of coffee holds the potential to fulfill the promise of the bean it derives from.

Despite its near universal availability and appeal, for the typical consumer, experiencing good coffee remains a somewhat elusive proposition. The average consumer, especially in the last 30 years, has benefited from a proliferation of choice, both from an agricultural and an equipment standpoint. But this proliferation of choice has not led to a proliferation of good outcomes. The consumer is swamped in contradictory information and has almost no predictive and outcomes-focused assistance in navigating this marketplace. This situation underserves not only the consumer, but the industry broadly.

The Science of Brewing

At its heart, preparing a good cup of coffee is, theoretically, extremely simple. A coffee particle is porous. Contact with a stream or a bed of water causes the cells on the surface of the particle initially, and as water percolates through the particle the cells in the interior of the particle, to release several extractable compounds. These compounds collectively are responsible for the experiential and flavor characteristics of coffee like color, aroma, flavor, texture, mouthfeel, etc. These compounds however are not all the same. They extract/dissolve at different rates and at different times, as a function of the amount of time the particle spends in contact with water. Spending less time than optimal produces a sour, vegetal brew. Spending more than optimal produces a bitter, burnt, smoky, dull brew. Furthermore, depending on the size of the particle, there may be a fair amount of mass inside the particle as well. The cells inside the particle will extract conformant with the same profile as cells on the surface of the particle, but staggered in time, since water has to work its way into the particle for it to start the process of extraction within. Depending on the density of the particles (different coffee beans are different in density, and even the same green coffee will have different densities depending on the roasting process; light roasted beans are harder than dark roasted beans), the insides of the particles will extract at a different absolute rate than the surface of the particle.

In essence, a batch of absolutely uniform coffee particles will extract in harmony with each other, as long as they spend the same, appropriate amount of time in contact with water, which has been heated to a correct temperature. Unfortunately, such perfectly homogenous batches of coffee particles are almost impossible to realize. All coffee grinders produce a somewhat gaussian-looking distribution around the point where the grinder is set to grind. Expensive, well calibrated, commercial grinders, equipped with large burrs, and powerful motors, produce tighter and more idealistic distributions, and lead to better in-the-cup flavor profiles. Most commercially available grinders produce almost unusable grind size distributions for filter/brew coffee straight out of the grind process. Taking into view the chemistry of coffee extraction, it is not difficult to see how even a small amount of non-conformant particles will make brewing a dissonant process. Non-conformant particles produce dissonances that take the following forms:

1. Finer-than-optimal and extremely fine particles extract rapidly and continue to extract well past the optimal extraction point, while particles of the optimal size are still working their way to their optimal extraction points. This introduces bitterness and dullness in the brew.
2. These fine particles travel to the bottom of the particle bed and clog the filter, inhibiting the release of water from the particle bed. Timely release of water is essential for a successful brew. This effect causes an artificial increase in the amount of time all particles in the bed must spend in contact with water, making all particles extract more than they are meant to extract. This further exacerbates bitterness and dullness in the cup.
3. The process of grinding inevitably introduces the husk of the roasted bean into the particle bed too. This exterior coating of the bean does not bear much flavor, but increases the mass of the particle bed, thereby unfavorably distorting the coffee mass to water mass ratio, which is a very critical ratio to perform optimal extraction. This effect not only makes the brew bitter, but it also makes it watery and insipid.

It is impossible to eliminate these dissonances by performing compensatory optimization in brew variables like water mass, water temperature, water-to-coffee weight ratios or water-to-coffee contact times. The only real way to achieve perfection in the cup is to fix the distribution of particles that enters the extraction process.

DETAILED DESCRIPTION

Figure 1:
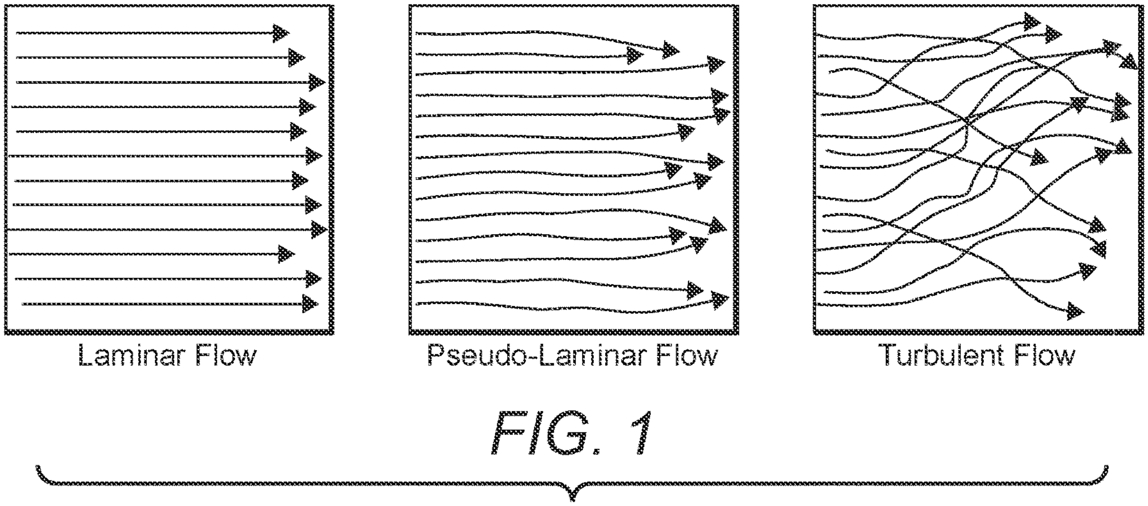
FIG. 1 is a diagram illustrating the concepts associated with different air flow types.

The use of a combination of forces (including but not limited to gravitational, mechanical and electromagnetic forces) to construct a dynamic particle sorter/filter. In some implementations, this combination can be applied to ground coffee particles.

Fan Physics

There are a broad range of fans available on the market, but they all largely conform to a relatively small number of principles. A fan is essentially an impeller attached rigidly to a motor. The motor does the work of rotating the impeller, thereby converting electrical energy applied to the motor into kinetic energy of air moved by the impeller. In order to do work, this impeller-motor combo is typically placed in the right kind of housing. For certain kinds of fans, it is this housing that channels the air and makes it capable (or in some cases more capable) of doing work. The output of a fan is denominated in two kinds of work. The more obvious form of work is the kinetic energy of the air on the discharge side of the fan. A less visible, but extremely valuable form of work, is the static pressure that the fan is capable of generating in the air it discharges or pulls. CFM (cubic feet per minute) is a metric which denotes the fan's volumetric capability to move air. Static Pressure characterizes the fans ability to move this air through obstacles, like meshes and filters. Static pressure is measured in Pascals (Pa) or inches of water (inH2O). Every fan has a characteristic fan-curve (y-axis for static pressure, and x-axis for CFM). At low volumes of airflow, fans are typically capable of generating their highest rated static pressure, and as the airflow volume increases, the fan's capability of generating static pressure reduces, tapering to zero as the fan approaches its highest CFM rating. A fan with PWM (pulse width modulation) speed control can be made to operate at a specific point on its fan-curve.

A feature of certain implementations disclosed herein is the ability to extract and contain fine coffee particles (dust). It is valuable to have clean-air characteristics especially since these devices are meant to be used indoors in a residential or commercial setting. With that in view, the outlet fans may be outfitted with appropriate dust collection filters and/or meshes. From a flavor maximization standpoint, it may also be important that the air being used to filter the coffee grinds is also filtered, so all ambient impurities (especially in commercial settings) are completely eliminated from the air before they touch the coffee grinds. This inlet air filter is also an important hygiene consideration (especially in commercial settings, to filter out pollutants, germs, viruses, etc.). In effect, one implementation of the invention is outfitted with corresponding filters on the inlet and outlet fans. In the case of single fan devices, it may not be possible to install an inlet filter, since that would impose a very high static pressure burden on the outlet fan, and such fans might be prohibitively expensive to manufacture. It is for this reason, that single fan devices would largely be suited more for residential/personal use cases.

Filters which are capable of handling very fine particles usually have high static pressure specifications. This is because these filters have microscopic pores through which air is allowed to travel, and the fan needs to perform a significant amount of work to overcome the resistance offered by the filter, and transfer air to the other side of the filter material. Typically a HEPA filter has a static pressure rating of 1 inch H2O. So any fan that needs to transfer air to the other side of a HEPA filter, needs to have a max static pressure rating greater than 1 inch H2O. The fan should be made to operate at a point on the fan-curve, where it can consistently deliver a static pressure greater than 1 inch of H2O at the desired airflow level. This imposes certain constraints on the kinds of fans which can be used in this device. In brief, from a kinetic energy standpoint they should have adequate airflow delivery capabilities, and from a static-pressure standpoint, these airflow delivery capabilities need to be satisfied at a static-pressure threshold greater than that imposed by the material from which the particle filters are made. Note that the filters used in implementations of the device need not be a HEPA filter. A filter of a lower grade may be equally effective, and a filter material should be chosen to meet the filtration requirement set by the smallest particles that need to be filtered out by the device. On example of a suitable filter material is MERV 13 filter material.

Device Physics

The working principle of this device is the utilization of a variable velocity flow of air (laminar, pseudo-laminar or even turbulent) against a curtain of falling particles to achieve filtration of these particles on the basis of their weight. By increasing or decreasing the velocity of the air flow, it should be possible to increase or decrease (respectively) the weight of the particles that are filtered away. For the most part, the volume and size of coffee particles discharged from a coffee grinder relate linearly to the weight of these particles, so the filtration achieved by this flow of air should perform filtration by particle size. In addition, the system may also expel larger particles having lower density, such as the husk portions of a coffee bean. The second half of the task is to completely collect the air being discharged by the filtering operation and pass it through a filter material to capture the particles being discharged, clean the air and return it out of the device.

In an ideal circumstance, the airflow may be laminar which causes the discarded particles to proceed to the vacuum chamber in an orderly manner. Laminar flows are difficult and expensive to implement, and an approximately-laminar flow (pseudo-laminar flow) should suffice. A turbulent flow will also work. Air pushed through a resistance, like a particle filter, should generate an approximately-laminar flow of air for a fair distance, depending on the air-flow velocity. This should be adequate to perform orderly filtration. The choice of flow depends on the price point of the device, and the kind of device experience which needs to be delivered to the operator. An orderly (laminar/pseudo-laminar) airflow should prevent particles from escaping the device and entering the ambient atmosphere. A turbulent airflow may allow particles to escape the device. FIG. 1 illustrates different airflow types. Laminar or substantially laminar flows have additional benefits to coffee. In particular, laminar or near-laminar flow reduces inter-particle collisions. Such collisions tend to reduce product quality—in particular, collisions between ground coffee particles negatively impact aroma and flavor characteristics and may alter particle size. As discussed below, desired air flow properties may be achieved with filters or a collimator-like device, such as a grating, that promotes even air-flow across a unit area.

A hopper assembly coupled to a vibration motor achieves a fixed rate discharge of particles. The hopper is a funnel-like apparatus into which the coffee grounds are placed for filtration. A discharge plate as illustrated underneath, is installed at the bottom of the hopper funnel. A vibration motor is attached either to the hopper funnel body, or to the discharge plate. When the vibration motor is turned on, the vibration of the motor is transferred to the coffee grounds from the body of the hopper funnel (if the motor is installed on the funnel), or from the discharge plate (if the motor is mounted to the discharge plate). There is a very large range of vibration motors available on the market. They differ from each other on the basis of the following properties: vibration motor size; vibration motor vibration axis; and vibration motor vibration strength/magnitude.

Depending on the mass of the coffee grounds and mass of either the hopper funnel or discharge plate to be agitated, an appropriate vibration motor can be selected. When the motor is turned on, the vibration of the motor is transferred to the coffee grounds, and this causes the coffee grounds to be passed through the discharge plate into the filtration chamber.

In the implementations discussed herein, filtration is achieved by the following operations performed by a particle filter mechanism:

a) Produce a uniform curtain of particles for filtration;
b) Perform filtration of this curtain of particles, by the use of force exerted against this curtain;
c) Absorb the air discharged from the filtration operation, clean it, and return it back to the environment. A device, say one used outdoors, may choose not to filter the air, since it would vent to the atmosphere and may not cause any meaningful drop in air quality for the user of the device. Such a device may not be appropriate for indoor use, if good air quality is a desired outcome.

The design of the device should consider the airflow requirements of these fans on the inlet side of the fan itself. If adequate air flow is not available to a fan, it may not perform any meaningful work. The rotor of the fan may still rotate, but in the absence of air, the fan isn't really moving anything, and so it isn't doing any work. This is a very important consideration, especially for dual-fan systems. The inlet fan typically is unrestrained and should have adequate air to work with, as long as there are no obstructions in front of the inlet of the inlet fan. Care needs to be exercised in the design of the filtration and vacuum chamber. The outlet fan's enclosure, which borders the vacuum chamber, needs to be designed such that plenty of airflow is available to prevent the outlet fan from going into stall—a state where the fan's impeller turns, but is not able to move air. If the vacuum chamber is inefficient or restrictive, it will prevent the outlet fan from being able to move air—i.e., choking the outlet fan. The outlet fan needs to be able to absorb the entire output exhausted by the inlet fan, in order to guarantee that all the particles being eliminated by the system are fully captured. In case the outlet fan chokes for lack of airflow, the particles that need to be trapped in the filter will instead travel haphazardly and may even be discharged into the environment. This is against the principles of the device, and so it is necessary that the outlet fan has adequate extra inflow of air, over and above the air-mass corresponding to the exhaust from the inlet fan. In some implementations, this is accomplished by providing air inlets to increase available airflow to the outlet fan.

Figure 3:
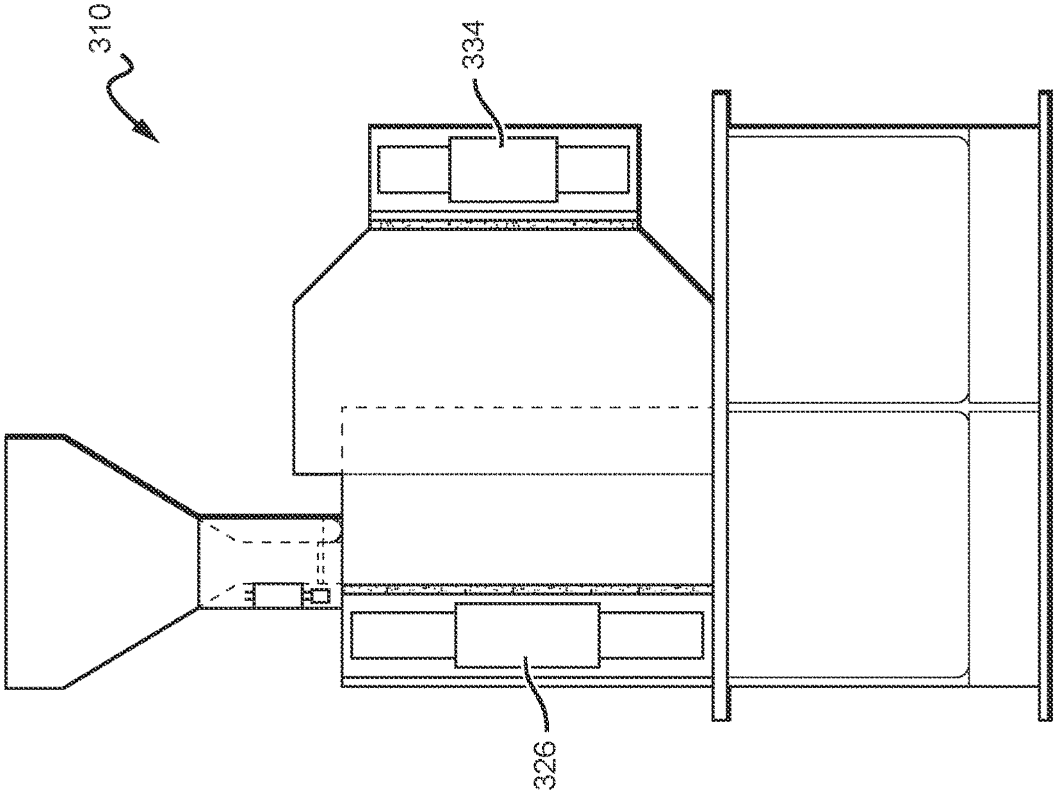
FIG. 3 is a side elevation view of another implementation of a filtration device.

The inlet and outlet fans can be different sizes relative to each other, or the same size. The key considerations in choosing fan pairs that work well together are:

1. Inlet fan should be able to produce enough airflow to overcome the resistance of a filter/mesh assembly and exert adequate force against the curtain of grinds to adequately purify them
2. The Outlet fan should be able to produce adequate airflow to overcome the resistance of a filter/mesh assembly and produce enough airflow to absorb the air flow and particles discharged by the inlet fan enclosure.
3. Typically the outlet fan enclosure should be larger than the inlet fan enclosure and overlap it slightly so that the particles and air being discharged by the inlet fan enclosure are completely exhausted into the outlet fan enclosure. The slight physical overlap also creates a direct air flow pathway from the atmosphere surrounding the device into the outlet fan, ensuring that the outlet fan has all the airflow required to function at its directed duty cycle.
4. Consideration 3 does not necessarily imply that the outlet fan needs to be larger than the inlet fan. It might be possible to construct a device where the outlet fan is smaller in size than the inlet fan (as shown in FIG. 3), but has adequate static pressure and airflow characteristics to perform the functions described above.
5. The devices may assume various shapes in order to accommodate fans of different sizes and ratings.

Given these physics considerations, there is a wide array of physical embodiments which can be realized by combining fans of various shapes, sizes, airflow patterns and fan-performance characteristics. These embodiments will have varying ranges of outcome along the key outcome dimensions, like filtration precision, particle throughput, noise, and device physical footprint. This variation in characteristics allow for a range of devices to meet needs at different segments in the market and at different price points.

Device Construction

The following sets forth various different implementations of the particle filter system. As shown below, some implementations may be "push-pull" systems including inlet and outlet fans connected to the chamber. Other implementations may be "pull" systems utilizing only a single outlet fan. Other systems may include an inlet fan combined with a vibration bed. Various implementations may optionally include filters and mesh assemblies.

Figure 2:
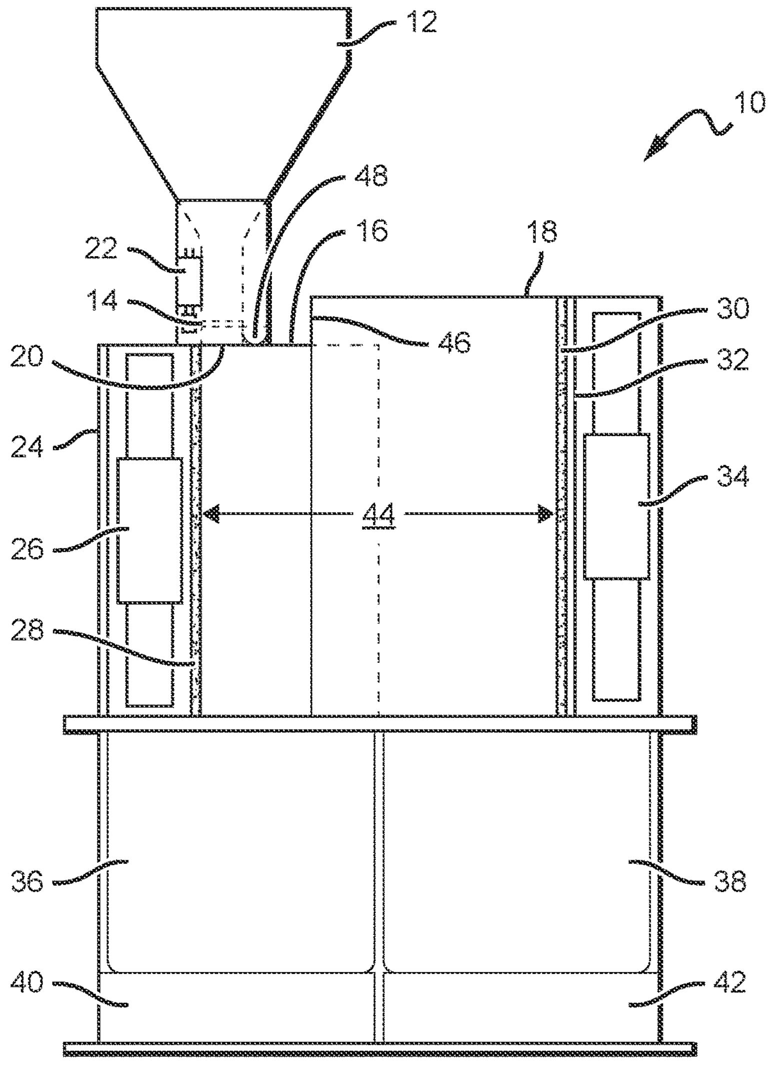
FIG. 2 is a side elevation view of one implementation of a filtration device.

FIG. 2 is a schematic diagram of an example push-pull particle filtration system 10. In the implementation shown, system 10 comprises a purification chamber 44 including an inlet fan enclosure 16 and an outlet fan enclosure 18. System 10 further includes hopper 12, hopper discharge plate 14 and vibration motor 22. As shown in FIG. 2, inlet fan 26 is mounted at a first lateral side of the purification chamber 44 and adjacent to the inlet fan enclosure 16 to provide a flow of air into the chamber 44. An inlet fan filter 28 is mounted between the inlet fan 26 and the inlet fan enclosure 16. System 10 may further include a grated guard plate 24 to protect a user's fingers or other objects from contacting inlet fan. System 10 also includes outlet fan 34 mounted at a second lateral side of the purification chamber 44 and adjacent to the outlet fan enclosure 18 to exhaust air from the chamber 44. An outlet filter 30 and a guard plate 32 may be disposed between the outlet fan enclosure and the outlet fan 34.

System 10 also includes a purified particle collector 36 and a discard particle collector 38. Generally speaking, the inlet fan enclosure 16 generally defines or is associated with a first zone or volume over collector 36, while outlet fan enclosure generally defines or is associated with a second zone or volume over discard collector 38. As shown in FIG. 2, outlet fan enclosure 18 may overlap inlet fan enclosure 16. Outlet fan enclosure 18 may also be separated from inlet fan enclosure 16 by a gap 46 extending along the top and opposing lateral surfaces of the outlet fan enclosure to define an air inlet for outlet fan 32. In operation, coffee particles fed into the purification chamber 44 from hopper 12 are filtered or sorted into either collector 36 or discard collector 38. As discussed herein, inlet fan 26 generates a flow of air that evacuates non-conformant particles from the first zone over collector 36. Outlet fan 34 operates to provide a vacuum force and exhaust flow of air causing the non-conformant particles evacuated into the second zone to remain and fall into discard collector 38. Particles not evacuated from the first zone fall to collector 36.

In some implementations, collectors 36, 38 are drawer like assemblies that slide in and out underneath the first and second zones respectively of the purification chamber. System 10 may also include weight sensors 40 and 42 to measure the weight of the particles collected in the collectors. System 10 may also include a microcontroller that controls operation of the inlet fan 26 and outlet fan 34, such as power them on and off and controlling speed. In one implementation, system 10 includes a user interface that allows an operator to select a fan speed for the fans 26, 34.

Figure 4:
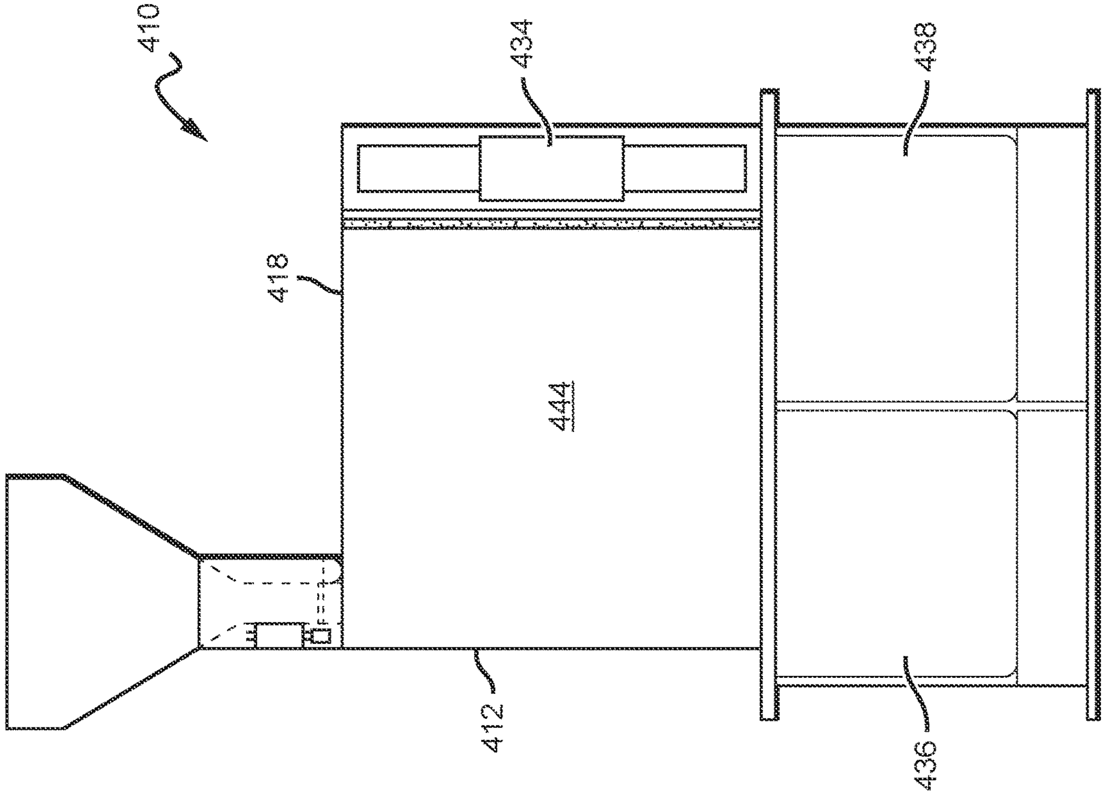
FIG. 4 is a side elevation view of another implementation of a filtration device having only an outlet fan.

Other implementations are possible. For example, FIG. 3 illustrates another implementation of a particle filtration system 310 where the outlet fan 334 is smaller than the inlet fan 326. In addition, FIG. 4 illustrates a particle filtration system 410 having a single outlet or exhaust fan 434. Accordingly, the purification chamber 444 is defined by an outlet fan enclosure 418. A lateral face 412 of the outlet fan enclosure 418 may be open to provide an air inlet. The lateral face 412 may further include one or more of an air filter or a guard plate. In operation, the outlet fan 434 may be powered to provide a flow of air across the purification chamber 444 to evacuate non-conforming particles from the first zone prior to collection in collector 436 to the second zone over discard collector 438.

Figure 5:
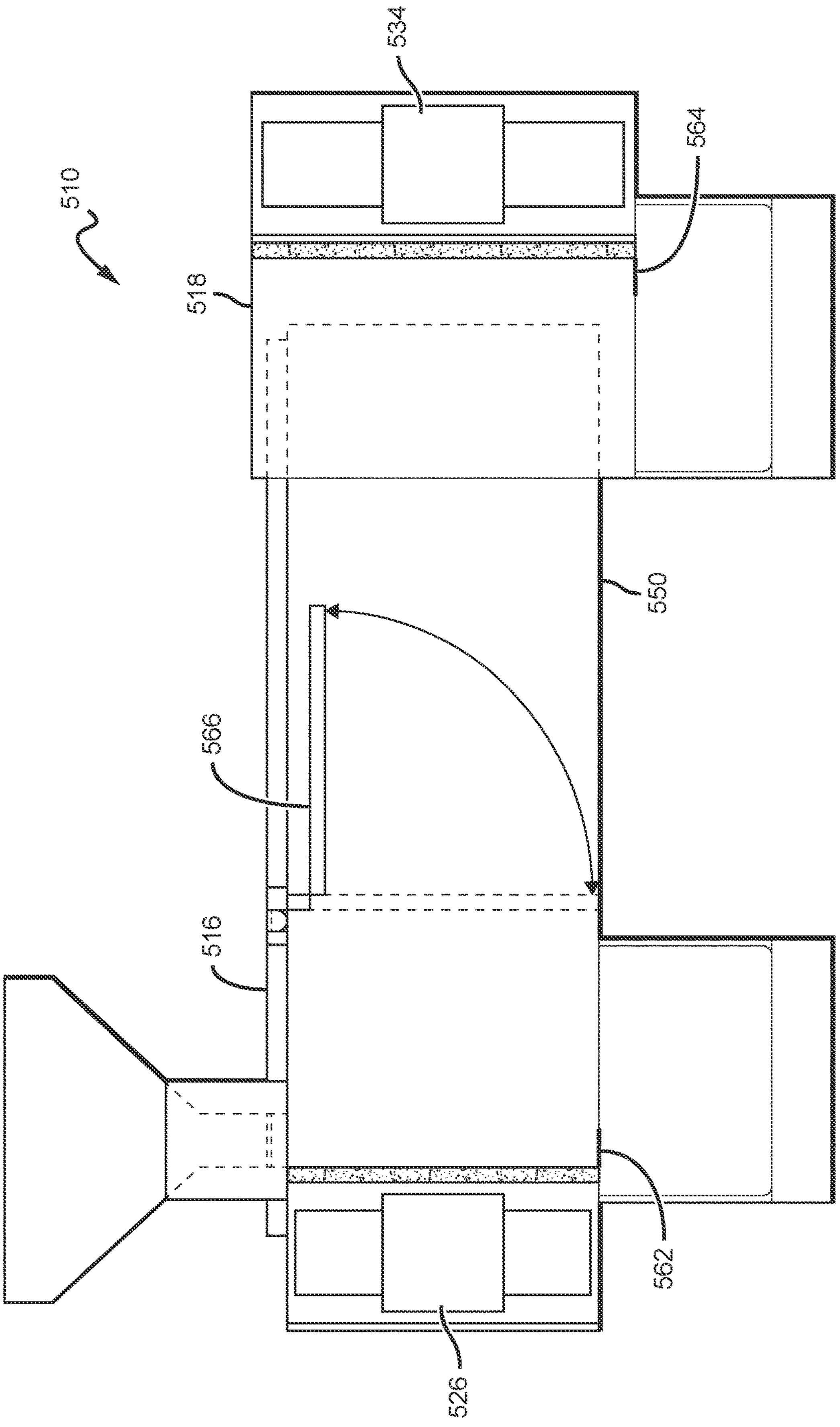
FIG. 5 is a side elevation view of another implementation of a filtration device having a sorting tube and sweep assembly.

FIG. 5 illustrates another example particle filtration system 510 where the inlet fan enclosure 516 and the outlet fan enclosure 518 are separated by a sorting tube 550. In the implementation shown, particle filtration system 510 operates in two phases. In a first phase, inlet fan 526 provides a flow of air that distributes particles at the bottom surface between openings 562 and 564 based on mass or weight. Outlet fan 534 can operate to capture stray particles from exiting the device. In the first phase, sliding sweeper assembly 566 is in an open phase as shown. In a second phase, the fans 526, 534 are de-powered and the sweeper assembly is oriented in a vertical orientation (as shown by the dashed lines in FIG. 5), essentially separating conforming and non-conforming particles disposed on the surface. The sweeper assembly 566 is then controlled to sweep conforming particles toward opening 562 for collection at a corresponding collector and, in a reverse direction, toward opening 564 to a discard collector. In one implementation, sorting tube 550 is made of a transparent material to allow operators to view the filtering and sorting process. In one implementation, the point at which sweeper assembly 566 separates the particles is a configurable parameter.

Figure 6:
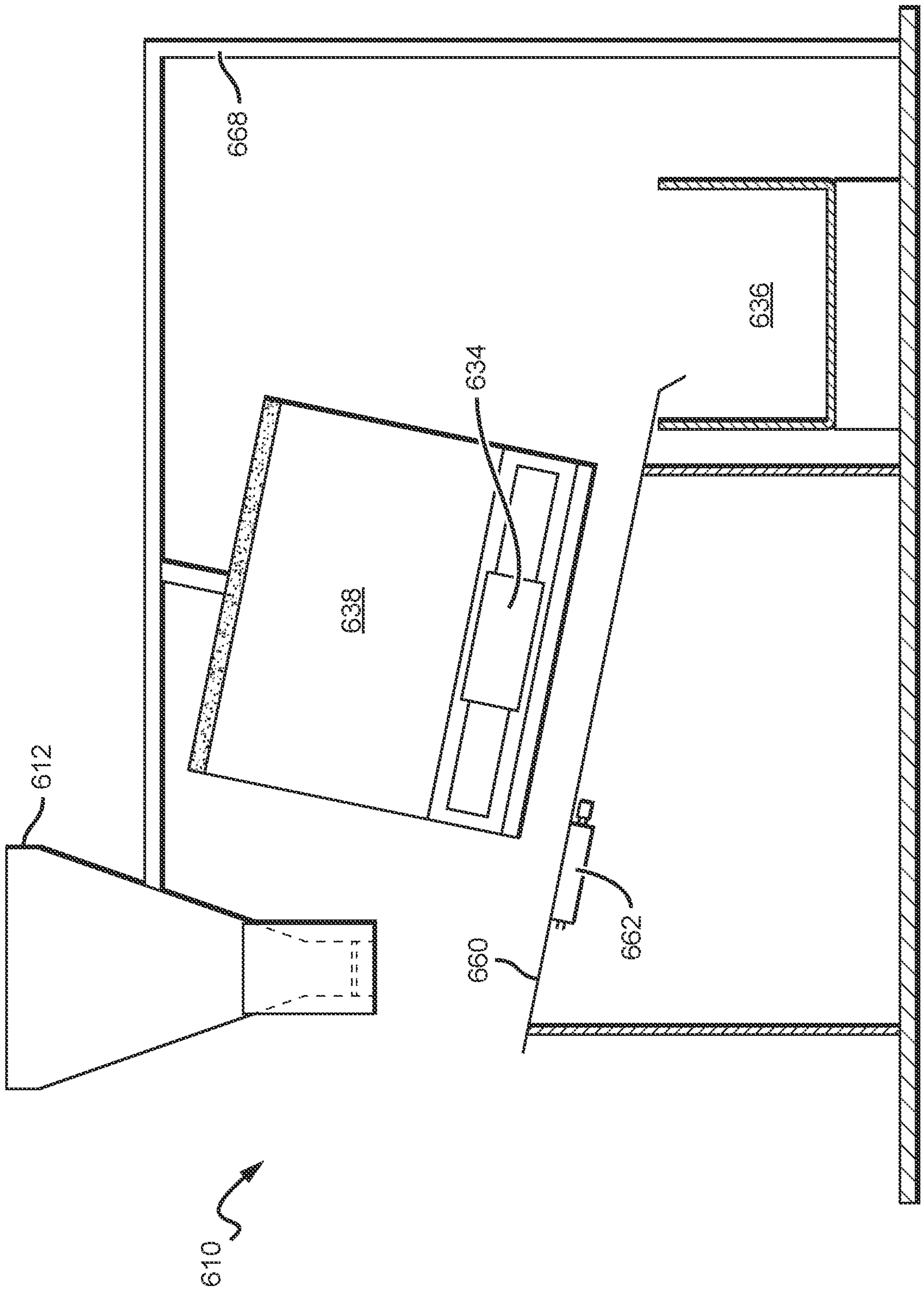
FIG. 6 is a side elevation view of another implementation of a filtration device having a sloped vibration bed.

FIG. 6 illustrates another example particle filtration system 610 including a single exhaust fan 634 that works with a sloped vibration bed 660. The hopper 612 deposits particles onto vibration bed 660. A vibration motor 662 agitates the particles, causing the particles to slide down the sloped bed 660. A structural support 668 holds an assembly including an exhaust fan 634 and a discard chamber 638. The exhaust fan 634 is disposed relatively close to the sloped bed 660. Exhaust fan 634 extracts non-conforming particles into collector 638 as they are agitated and pass down sloped bed 660. The remaining particles ultimately fall into collector 636.

Figure 11B:
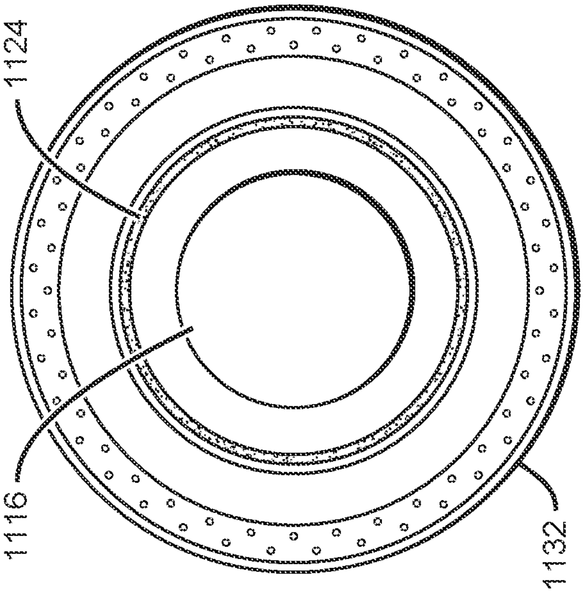
FIG. 11B is a top view of a particle filter system.
Figure 11A:
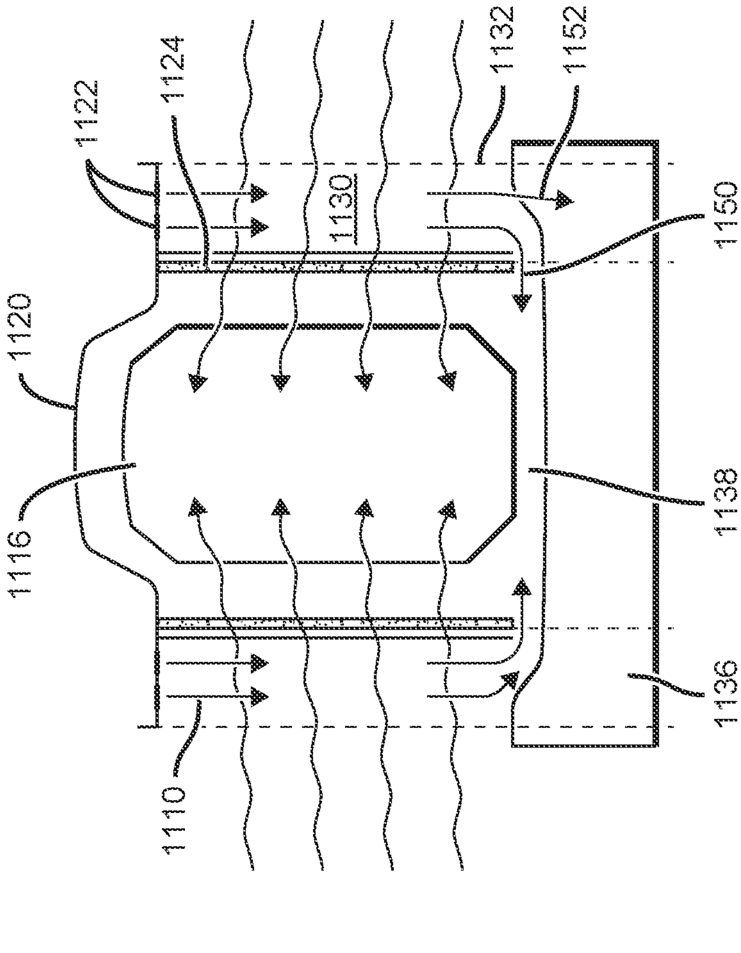
FIG. 11A is a side sectional elevation view of another implementation of the particle filter system.

FIGS. 11A and 11B set forth another example particle filtration system 1110 that includes a centrally mounted fan. The operation of this implementation is similar to the exhaust-fan-only systems set forth above with the main difference that the fan is centrally arranged within the device. As shown, filtration system 1110 includes a circular hopper 1120 having a trough-like configuration in cross-section. Openings in the hopper 1122 permit coffee particles to enter the filtration chamber 1130. A central fan assembly 1116 (as described in more detail below) creates a flow of air extending radially inward. The device includes an outer wall 1132 with perforations to permit air flow and a circular filter/mesh assembly 1124 defining the inner wall of the filtration chamber 1130. In the implementation shown, outer wall 1132 can be separated to define a filtration chamber 1130 with filter/mesh assembly 1124. In another implementation, the outer wall 1132 can be arranged directly adjacent to the filter/mesh assembly 1124 such that filtration chamber 1130 is exposed to the outside environment. Particles that fall from hopper 1120 into chamber 1130 are separated by the flow of air. Particles having less than a threshold weight or mass generally follow path 1150 into discard collector 1138, while the remaining particles follow path 1152 into particle collector 1136, which can be separated from the device 1110 to allow the particles to be dispensed.

Figure 11D:
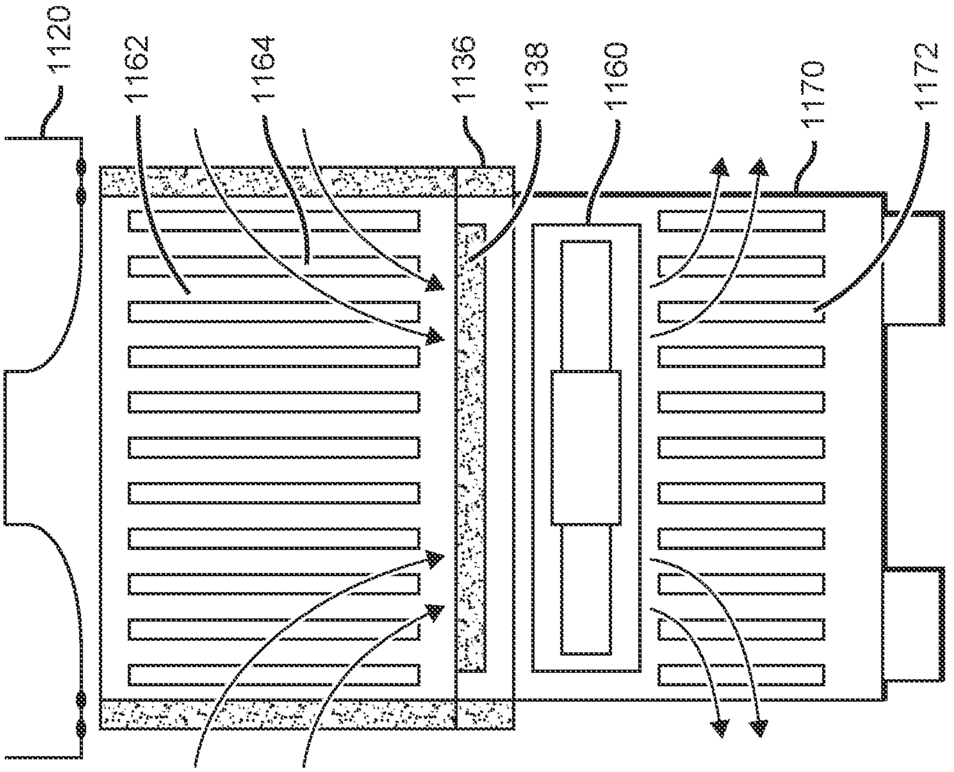
FIG. 11D is an exploded sectional view of the particle filtration system according to another implementation.
Figure 11C:
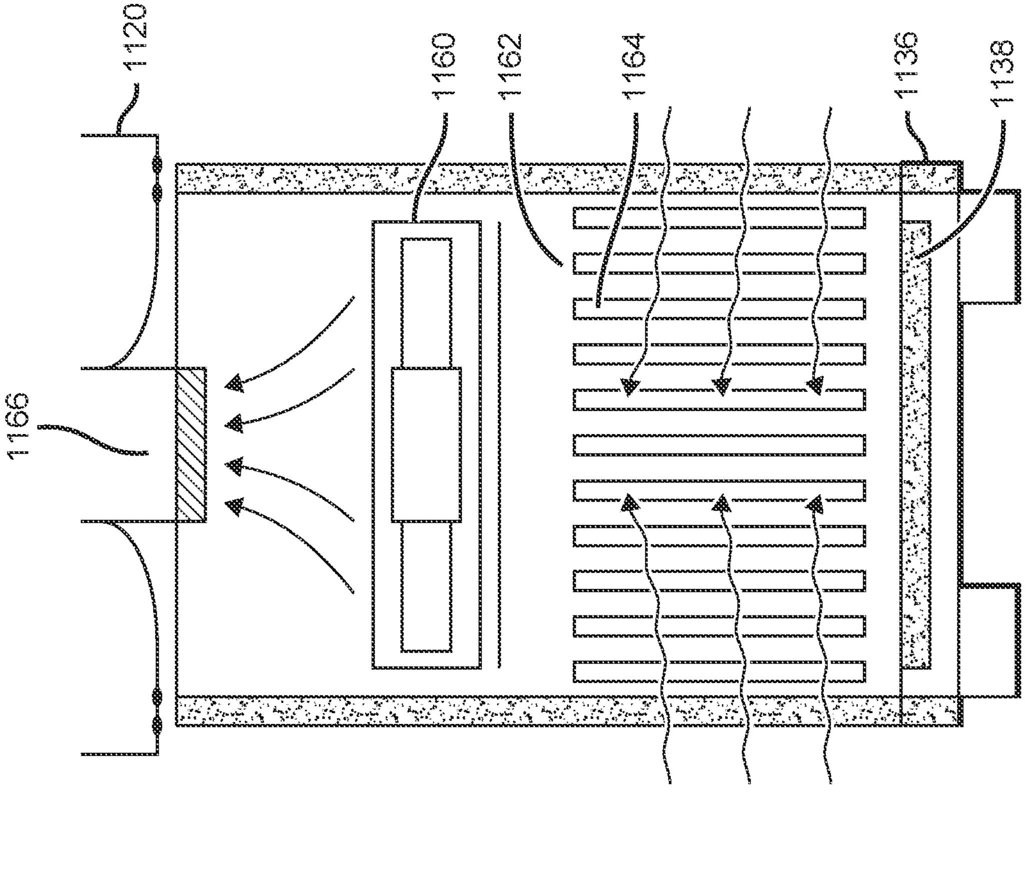
FIG. 11C is an exploded sectional view of the particle filtration system according to one implementation.

The central fan assembly 1116 can take a variety of forms. FIG. 11C illustrates an example implementation where central fan assembly 1116 comprises an axial fan 1160 mounted above a cylindrical assembly 1162. The axial fan 1160 creates an air flow from chamber 1130 through slots 1164 in the cylindrical assembly 1162 and out an exhaust vent 1166 in hopper 1120. In operation, non-conforming particles travel through the slots 1164 and fall to discard collector 1138, while the remaining particles fall to collector 1136 as discussed above. A filter may be disposed between the fan 1160 and the cylindrical assembly to prevent particles from being exhausted from the device 1110. FIG. 11D illustrates another example implementation where the axial fan 1160 is mounted below the cylindrical assembly 1162. As shown in FIG. 11D, the device further includes a second cylindrical assembly 1170 and outflow vents 1172 to allow the fan 1160 to exhaust the air from the device. In the implementations described above, the fan 1160 may be an axial fan or a centrifugal fan.

Inlet Fan Enclosure

The push-pull devices described above, such as particle filtration system 10 illustrated in FIG. 2, may include an inlet fan enclosure 16. A lateral portion of the enclosure may contain one or more of the following device parts: an inlet fan 26, a filter 28 (e.g., HEPA or lower-grade) or other component that promotes pseudo-laminar flow of air. The enclosure 16 may further include an inlet fan speed control potentiometer, inlet pressure sensor, camera sensor or module 48.

Figure 7A:
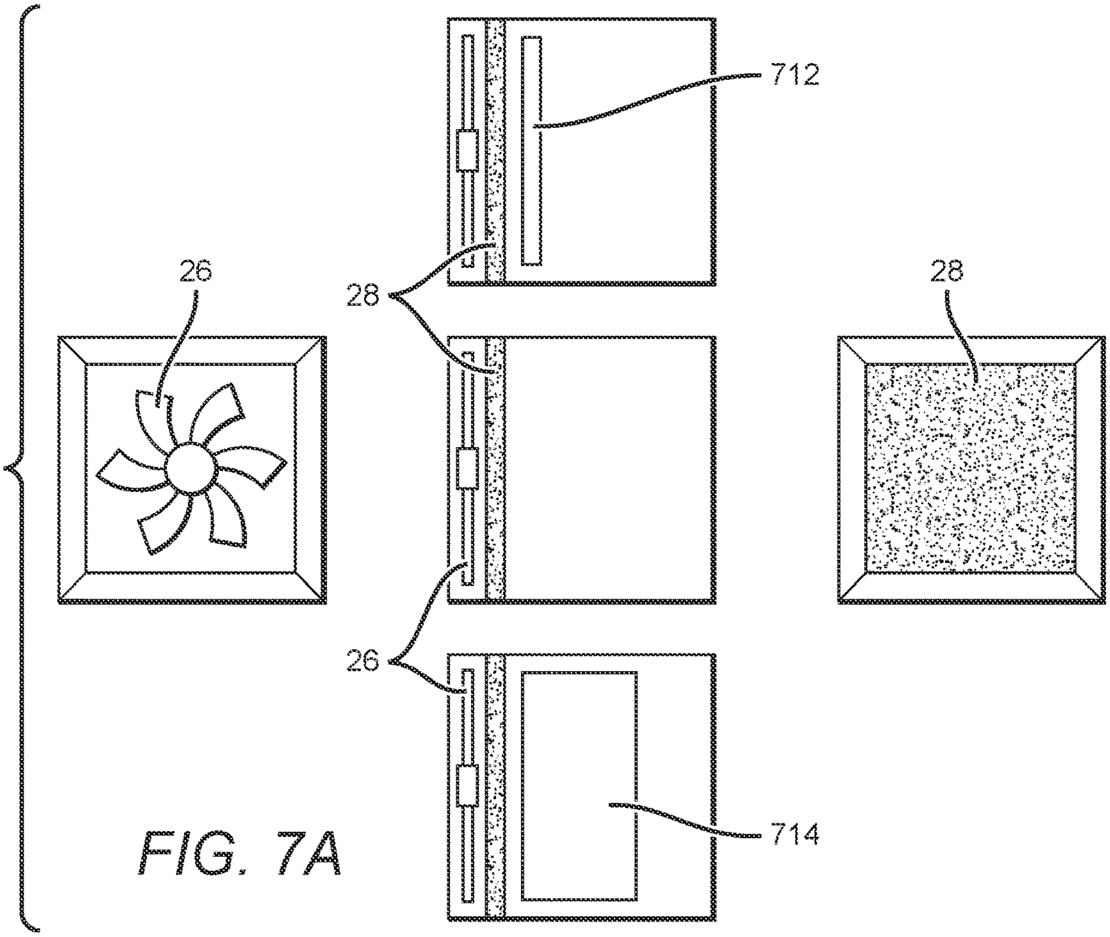
FIG. 7A provides different views and components associated with an inlet fan enclosure.
Figure 7B:
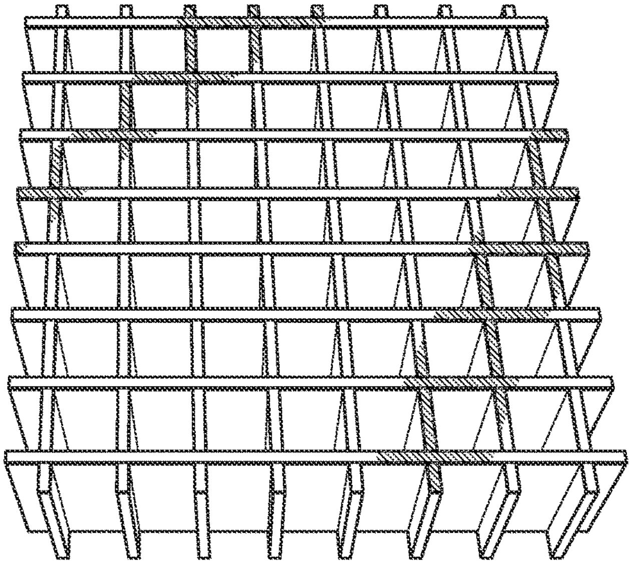
FIG. 7B is a perspective view of a grid promoting pseudo-laminar flow.

As FIG. 7A shows, the inlet fan 26, if present in the device embodiment, may be shrouded in an enclosure or assembly that includes other components discussed herein, such as guard plates, filters 28 and the like. The input side of the fan remains relatively unobstructed, so as to provide the maximum amount of air the fan can require for its effective functioning. There may be a mesh or grating installed at the input side of this fan, to ensure that fingers or other objects do not come into contact with rotating fan blades. The air coming into the fan, then passes through the inlet fan filter 28, which purifies the air, and also makes the air flow smooth and removes some of the turbulence that the fan introduces to the airflow. In the event a filter is not required (because this is a residential unit, and the air is considered clean enough, for instance), a pseudo-laminar flow can be realized by means of a pseudo-laminar-flow mesh (e.g., 1-2 mm openings) or grid (1 cm openings, as illustrated in FIG. 7B). The choice of using a filter, mesh or grid depends on a variety of design and engineering considerations, including target use or market, fan power, and the like. Depending on the specifications of the filter (or other pseudo-laminar flow component), inlet fan 26 is selected and configured to work past the resistance (static pressure) of the filter 28 to produce an airflow that has the kinetic energy to produce the sorting/separation described herein, as well to work past the resistance of the outlet fan filter. Alternatively or in addition to a filter 28, the filter system can include an air collimator device (grid) as depicted in FIG. 7B to channel the air and provide smoother air flow relative to the raw output of a fan. A grid allows for lower power fans to be used, but tends to have other disadvantages, such as being unable to retain all particles within the device. Furthermore, the air filter may be removable to allow for cleaning or replacement.

In the implementation shown, after this component, there is an opening 712 at the top of the inlet fan enclosure 16, from which grounds are discharged into the enclosure. The remainder of the enclosure provides the chamber or space in which the grounds are filtered and purified, where particles over a threshold weight falling into the opening 714 above the collector 36.

A pressure sensor may optionally be placed just after the filter to measure and track the air-pressure generated by the inlet fan. Different levels of filtration may be achieved by different air-pressure outputs from the fan. Optionally, a potentiometer is provided which allows the user of the device to control the inlet fan's speed. It is possible for the microcontroller to control the fan speed autonomously, but in some embodiments, a potentiometer may allow the user to control the fan by bypassing the microcontroller. In other embodiments, the microcontroller does not determine the fan speed, and such speed control decisions are left entirely to the user. There are various kinds of potentiometers on the market, like rotary encoders, rotary potentiometers, linear potentiometers, rheostats, etc. Depending on the usability criteria desired, an appropriate potentiometer can be selected. In a device embodiment that contains a touchscreen, physical buttons and knobs are usually not required, since these functions can be implemented via affordances on the screen.

Outlet Fan Enclosure

Figure 8:
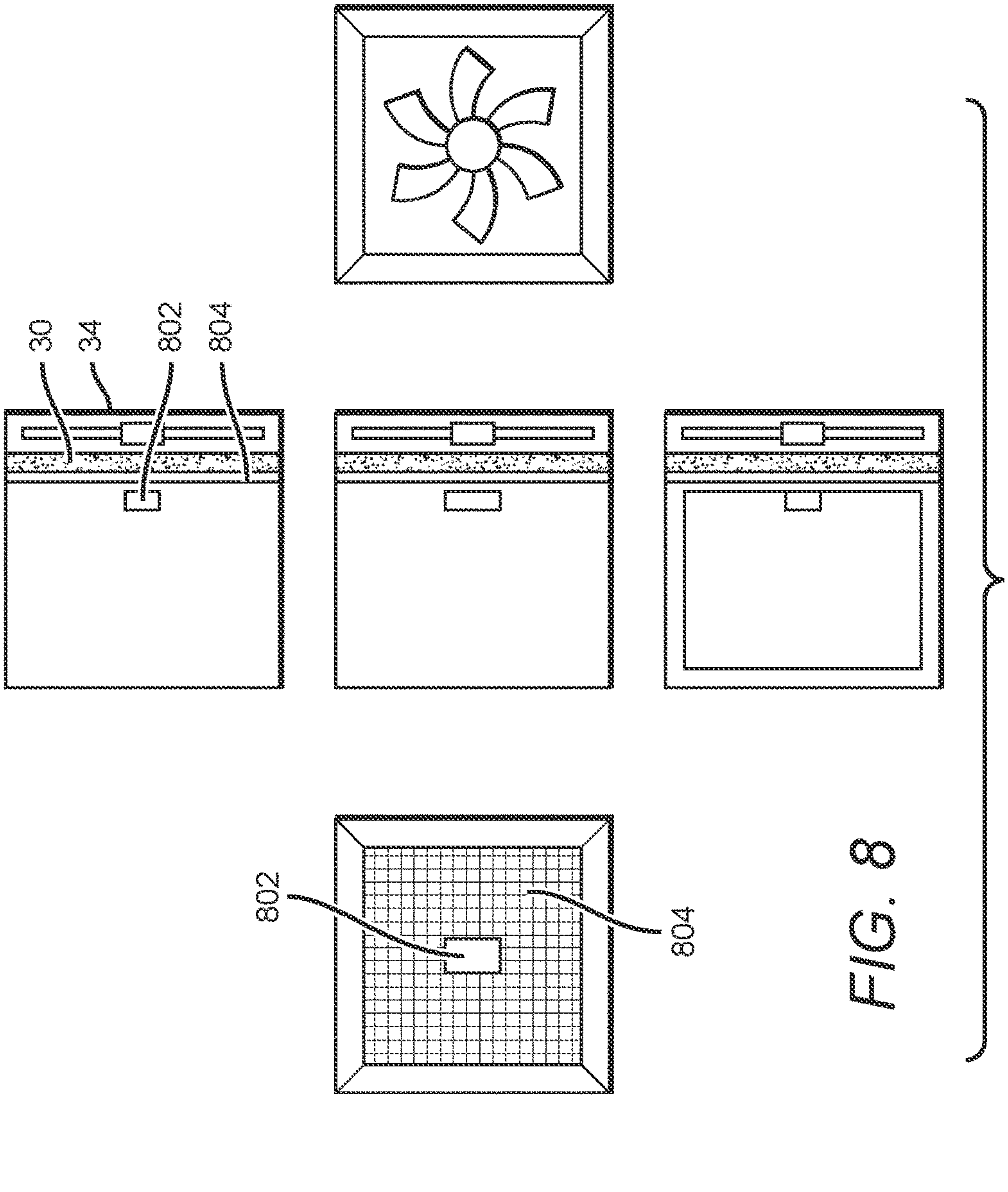
FIG. 8 provides different views and components associated with an outlet fan enclosure.

As shown in the various figures, an outlet fan enclosure (e.g., enclosure 18 in FIG. 2) may also be provided. As FIG. 8 illustrates, the outlet fan enclosure 18 may include an outlet fan 34 and an outlet filter 30.

As described herein, the outlet fan 34 is shrouded in an enclosure. The input side of this fan 34 receives the flow of air which is discharged by the inlet fan. This air, in addition to a requisite amount of ambient air, is passed through a series of meshes and/or filters. The purpose of these meshes and filters is to capture the particles which are discarded by the filtration phase of the process. In the implementations described herein, the distinction between a mesh 804 and filter is the following: a mesh is a semi-permanent component of the assembly, which is responsible for capturing relatively large particles, whereas a filter is an exhaustible or replaceable component, which captures fine particles and gets clogged over time. Filters, typically made from less durable materials such as paper or cloth, require periodic changing, whereas the mesh, typically made from more durable materials such as metal or plastic, is a relatively long-lived component. The mesh, by trapping larger particles, potentially prolongs the life of the filter which only traps relatively smaller particles. After passing through the meshes and filters, the air is collected by the fan, and exhausted back into the environment.

In addition to these components, an ionizer 802 may be installed in the outlet fan's enclosure, in front of the mesh and filter assembly. The purpose of this ionizer is to impart an electrical charge to the particles entering the outlet fan assembly, and to cause them to fall under the effect of gravity, before these particles have a chance to reach the mesh and filter. Such an arrangement may prolong the life of the mesh and filter components, and make it easier to clean and maintain the product. A pressure sensor may optionally be placed just in front of the mesh and filter assembly, to measure and track the air-pressure generated by the outlet fan. Optionally, a potentiometer is provided for the user to explicitly control the speed of the outlet fan. Typically, once the inlet fan's speed is known, the outlet fan's speed can be automatically calculated and set. But in some embodiments, the user may require or desire controls to set this speed manually.

Optionally, a clip may be installed in the outlet fan enclosure, that provides a mechanical interface to the operator to agitate the mesh 804 and cause any grinds or particles which are lodged in the mesh to fall off the mesh and into the discarded particle collector. This provides a simple mechanism to keep the device as clean as possible and in a performant state across more detailed cleaning operations, which might require the removal of the mesh 804 for cleaning/replacement or replacement of the outlet filter 30.

Hopper

Figure 9:
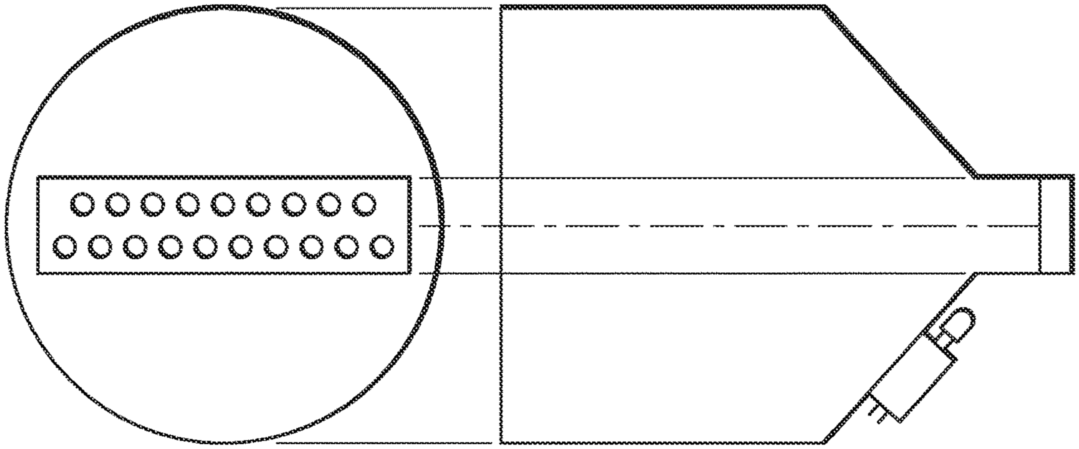
FIG. 9 provides a side elevation view of an example hopper assembly.

FIG. 9 shows an example hopper that may be used in various implementations of the invention. As shown in the various figures, the hopper's body may be shaped like a funnel, to allow for a gravity assisted flow of coffee grinds.

The coffee grounds are poured into the top of the funnel. The bottom of the funnel is attached to the inlet fan enclosure. In the case there is no inlet fan, the hopper is attached to the outlet fan enclosure. The bottom of the funnel may be a wide opening that spans the width of the enclosure that the funnel is attached to. The purpose of this opening is to afford a space for a curtain of grinds to fall into the enclosure the funnel is attached to. The hopper need not have a funnel shape and may include other profiles, such as box-like or rectangular configuration.

Above the opening, is a discharge plate that is mounted within the hopper assembly. If the hopper vibration motor is mounted to the discharge plate, the discharge plate should allow for just enough motion so that when it vibrates, its vibration can be transferred to the coffee grinds resting on it. A vibration motor is attached either to the body of the hopper, or specifically to the discharge plate. When the vibration motor is mounted to the body of the hopper, and when the motor is turned on, the grinds in the hopper receive the vibration, and the agitation causes the grinds to fall through the holes in the discharge plate and enter the enclosure that the hopper is attached to.

There are various designs of the discharge plate, and they create different patterns of grinds as they exit the hopper and enter the enclosure. Overall, the discharge plate may have a hole pattern that is relatively narrow in breadth, but wide relative to the chamber to provide a curtain of particles to be filtered. These design variations include but are not limited to different profiles (flat, round, oval, incline, etc.), hole patterns (multiple rows, different hole arrangements, etc.), heights, etc. The discharge plate may be suspended via a spring or a set of springs such that it moves without friction or abrasion. Such an assembly may allow the discharge of grinds from the hopper without requiring as much force compared to a hopper design where the discharge plate is rigidly attached to the hopper body. A suspension assembly may reduce the power and hence the noise of the funnel motor without reducing the effectiveness of the hopper. A suspension assembly may also reduce noise by eliminating or reducing mechanical friction of the discharge plate with the device body. Such an arrangement may be more user friendly.

A variety of implementations and configurations are possible. Optionally, a switch may be provided to the operator, to turn on the hopper vibration motor. In some embodiments, a touch screen interface or an external app may provide an interface to control the hopper vibration motor. Optionally, a weight sensor may be integrated into the Hopper. The function of this weight sensor is to keep track of the mass of coffee grounds in the hopper, and to use that information to automatically either start, stop or start-and-stop the hopper vibration motor. Such a feature will allow the user to use the device in a somewhat hands-off manner, and potentially focus on other tasks. Optionally, arrangements with multi-level discharge plates are also possible, where there are two or more plates placed one on top of the other, with different hole patterns.

Purified Grounds Collector

As discussed above, collector 36 catches the purified grinds. In some implementations, the collector 36 is a removable component and, when inserted in the device, maintains a substantially airtight seal with chamber 44. As discussed, collector 36 rests on a base, and can be easily removed by the operator to retrieve the purified grinds.

Optionally, this collector rests on a weight sensor 40 that tracks the mass of the purified grinds as they are collected in the collector. The purpose of this weight sensor would be to display the mass of purified grinds to the user of the device. It can also be used to stop the purification process. If more than a set number of seconds have passed without any change in the registered mass of the purified grinds, it might be assumed that there are no more grinds left to be purified in the hopper. That might be a loose assumption, since more particles might be collecting in the discarded grounds collector. If a weight sensor 42 is located under the discarded grounds collector, that sensor's information may be consulted while implementing a stopping criteria for the purification process.

Discarded Grounds Collector

Discard collector 38 catches the discarded grinds. It would be ideal if this collector maintains an airtight interface with the vacuum chamber. Taking manufacturing tolerances into account may not always permit for an airtight fit. This component may or may not be rigidly connected to anything in the device. It is possible that it rests on the base, and can be easily removed for retrieving the discarded grinds. In other embodiments, it may be somewhat tightly attached to the base. In that instance, there may be an extra outlet from the discarded grounds collector, into which an external high capacity vacuum device may be connected. In this instance, in order to ensure physical stability, the Discarded Grounds Collector does not move easily and provides a stable surface for such a connector to be attached.

Optionally, the discard collector 38 rests on a weight sensor that allows for real time tracking of the mass of discarded grinds that are collected in the discarded grounds collector. This information can be used in many ways. It can provide an indicator to the operator to clear this container when the mass of the discarded grounds meets or exceeds a certain threshold. It can also be used to automatically determine when the purification cycle should be terminated—when there are no more grinds accumulating in the purified grounds collector 36 and the discarded grounds collector 38, it is safe to assume that the hopper has been completely discharged, and that the purification cycle may now end.

Optionally, this collector allows an interface to an external high capacity vacuum device, that can be used to siphon off discarded grounds at regular intervals, without requiring any operator intervention. When the mass of grounds in the discarded grounds collector 38, meets or exceeds a certain threshold, the microcontroller or microprocessor can activate the external high capacity vacuum device to remove all grinds from the discarded grounds collector 38. Alternatively, a message can be relayed to the operator on the touchscreen, or via some signaling interface on the device like a LED, to activate the external high capacity vacuum, and empty the discarded grounds collector 38. Note: the discarded grounds collector 38 collects the particles that do not meet the target particle weight. These collected particles may be used, for example, in another coffee brewing process and not discarded.

Display & User Interface

There are several display possibilities for implementations of the filter device.

Optionally, a non-touch display may be mounted on the device to show information to the user. This information can include but is not limited to coffee product information, fan speed settings, sensor values, weight values from the purified and/or discarded grounds weight sensors, recipes, etc.

Alternatively, a touch-display may be mounted on the device which allows the user of the device to control the device, and to interact with software on the device. The software on the device may make use of the networking capabilities on the device, and communicate to the central servers and can expose a wealth of information and functionality, almost similar to a touchscreen enabled mobile application.

It is possible that no display is embedded with the device, and the operator controls the device and performs all functions against the device using a mobile app that communicates with the device using WiFi or Bluetooth, or other networking technology. Optionally, it is possible that there are no display interfaces integrated against the device, and all functions are performed using switches such as the speed control potentiometers and hopper vibration motor switch.

A touch screen or other display integrated into the device turns the device itself into a highly interactive and dynamic robotics system that not only performs the action of purifying the coffee, but also supports nearly every possible downstream action needed to realize a brew once the coffee is purified. These actions include and are not limited to offering brewing recipes for every instance of coffee purification, educational tools like instructional videos, the opportunity to rate the coffee, opportunity to rate the recipe, opportunity to identify which flavor and taste outcomes were successfully attained, opportunity to discover products the user may like on the basis of feedback offered, the opportunity to purchase coffee on the basis of feedback offered, etc. The touch screen also allows the user to manage the device, perform profile and account management tasks, provide payment and shipping information for marketplace activities like purchasing coffee, communicating with merchants like coffee roasters, etc.

Networking Capabilities

The device may also come provisioned with a WiFi, Bluetooth or other networking module which allows the device to interact with the server or an operator driven client device (like a smartphone, tablet, etc.), or multiple user client devices (like smartphone, tablet, etc.).

Compute Capabilities & Controller

A Microcontroller or a microprocessor is provisioned with the device to handle all the device's local compute needs, like driving the on-device fans and motors, to drive any on-device displays, monitoring and received feedback and control information from on-device sensors and peripherals (like potentiometers, weight sensors, pressure sensors, etc.), communicating with external devices via on-device network capabilities, etc. The microprocessor or microcontroller has the ability to augment its compute capabilities by using the networking interfaces on the device to either communicate with an app on the operator's smartphone (via Wifi, Bluetooth, etc.) or to a remote server (via WiFi, or via the operator's smartphone or other device).

In some implementations, the inlet and outlet fans are controlled by a Pulse Width Modulated (PWM) signal. Each fan may have 4 wires. Two of them are positive and negative inputs for the fan's input power supply. The third is an input signal called PWM (Pulse Width Modulation) and the fourth is an output sensor that reports the fan's realized revolutions per minute (RPM), commonly referred to as a tach signal. The PWM signal is a variable duty cycle pulse signal as illustrated underneath. The fan's speed increases linearly in relation to the duty cycle. Approximately, a 0% duty cycle is effectively an OFF state, and 100% duty cycle is full speed, at which the fan delivers max air flow. Most microcontrollers have capabilities to use internal timers to generate PWM signals at a desired frequency.

The microcontroller may also be connected to one or more pressure sensors. The pressure sensors may be used to measure the actual air-pressure delivered by the fans. For a given filtration cycle, the pressure delivered by the input and output fans should be a fixed constant, but as the circuit warms up and the fans receive power, they often deviate from their operation points. A pressure sensor may be used to provide a feedback signal that the microcontroller uses to adjust the PWM signal of the inlet and/or outlet fans and keep the system operating at its desired airflow/static pressure point.

A camera sensor may also be integrated in the inlet fan enclosure, just next to the hopper assembly opening into the purification chamber. The camera lens looks down towards the purified grinds collector. This camera allows the filtration device to monitor the purification process while it is happening, and to perform micro adjustments to the motors and fans in response to possible changes in ambient conditions to ensure maximal purity. Such monitoring is performed using deep learning computer vision algorithms, and may be performed in near-real-time, on the device itself. The camera can also send high-resolution images to a remote server for more detailed analysis which cannot be performed on the device, if the computer vision algorithms demand more compute resources than are available on the device. This camera sensor may also have an important function in ensuring the instrumentation of the other key outcome of the purification process. Since the camera can capture images of the grinds collected in the purified grinds collector, it can perform computer vision-based analysis on the grinds, and accurately estimate the size distribution of the grinds which have been purified. This information can be used, along with the weight information collected by the purified grinds weight sensor, to accurately compute a brew recipe with very refined adjustments to critical brew variables, namely, weight of water to the used for brewing, temperature of the water, the number of pulses of water to be used for brewing, the weight of the water pulses, etc. Correct computation of this recipe will ensure a highly personalized and high-quality brew conformant not only to the specific product the user is brewing (coffees of different origins have different flavor and physical characteristics), but also to user preferences (e.g., some users might prefer a high-acidity, silky body on their brews, whereas others might want bold, heavy bodied coffee with low acidity and the like).

Brew Platform

In some implementations, the particle filtration system described above can be integrated into or form part of a brew platform. The brew platform is a standalone entity (in one embodiment; it could be integrated into the body of the main device too) that integrates a load sensor of appropriate weight rating (5 kg, 10 kg, 20 kg, depending on the nature of the installation environment-residential or commercial) which connects to the main device using either a wired or wireless interface (or in the case of a hard integration, no wires will be visible). The brew platform allows the end user to actually place brewing equipment like a flask (a container to collect brewed coffee) and a brewer (like a Chemex or a Hario V60), into which the purified grounds can be placed for brewing.

The brew platform provides the final set of technology affordances for the filtration device to support the user in brewing an excellent cup of coffee. This affordance ties in the outcome of the brew (a cup of coffee) to the purification process and parameters used for the grinds, and allows the system to instrument a hard-feedback loop into its process and functioning.

Once the grinds are purified, and the weight of the purified grinds are known (by the purified grinds weight sensor) and the size distribution of the purified grinds are estimated (by the use of the camera sensor), the server can provide an optimal recipe to brew these purified grinds. Once the brewing equipment is placed on the platform, exact steps with timing will be provided to the user either on a mobile phone app, or an integrated touch screen display, or another appropriate user interface in the form a detailed recipe. Since the brew platform contains a weight sensor, the filtration device will know exactly how much progress the user has made in the execution of the recipe, and the device can support the user through all the steps of the recipe.

An example of the recipe is as follows: Say the user collected 35 gms of purified coffee grinds, within a size distribution of x mm to y mm of grind size. The server users this information to predict that the user should use 490 ml of water, boiled at 185 F, and that the recipe takes the following form:

1. Pour 70 ml of water on the grinds in even concentric circles to soak all the grinds, and let the grinds steep and release any latent $CO_2$ for 35 seconds. This step is conventionally called 'Blooming'.
2. Pour 70 ml of water on the grinds in even concentric circles within 10 seconds, and let the water thus poured drain for 10 more seconds.
3. Repeat step 2, 5 more times for a total brewing water volume of 490 ml.

At each step the weight sensor in the brewing platform will report the actual poured water volume to the filtration device, and the device UI can report any micro changes that need to be made to the recipe in real-time. For example, in some steps the user may pour an extra 10 ml or may be slower or faster in pouring the water. The AI in the device and/or the server can accommodate these deviations, adjust the recipe in real-time and ensure that the final outcome is as close to ideal as possible.

Life of a Grind—Example Operation

The following describes an example operation or experience using a particle filtration system according to one possible implementation including an inlet fan and an outlet fan.

1. A batch of coffee beans is ground, either in a separate, external machine, or on a tightly coupled grinder that is integrated with the filter device. This process produces a batch of coffee grinds.
2. These coffee grinds are introduced to the hopper, or a similar, equivalent assembly. The function of the hopper is to contain and stage the coffee grinds for purification.
3. After the hopper vibration motor is turned on, these coffee grinds agitate against the discharge plate. This process of vibration-assisted agitation causes the grinds to flow through the holes in the discharge plate and enter the filtration chamber. The vibration forces exerted by the vibration motor also assist to loosen up the grinds and prevent grinds from clinging to each other in the next phase of the process.
4. Once in the filtration chamber, the grinds will fall to the bottom surface of the chamber under the effect of gravity.
5. Also in the filtration chamber, the grinds are exposed to an airflow that is created either by the effect of the inlet fan (if present) or by the effect of the outlet fan.
6. This airflow can be considered to be a fixed speed airflow within the filtration chamber. The speed of the airflow is variable and can be adjusted by a potentiometer or via algorithmic control by the on-device microcontroller/microprocessor or remotely by a server. Each speed value corresponds to the maximum weight of a coffee grind (a threshold weight) that this airflow has the capability to move out of the filtration chamber into the vacuum or exhaust fan enclosure of the chamber.
7. Grinds which are heavier than the threshold weight will fall under the effect of gravity and be collected in the purified grounds collector. Grinds and particles lighter than the threshold weight continue onto the exhaust fan enclosure.
8. In the exhaust fan enclosure, under the combined effect of the airflow of the Inlet Fan (if one is present) and of the Outlet Fan, some grinds will be carried straight into the discard collector. Some particles and grinds will come under the influence of the ionizer and fall into the discard collector. The remaining grinds will reach the outlet fan mesh, where particles larger than the outlet fan mesh size will get trapped. Those particles which are smaller than the mesh size will continue on to the outlet fan filter, where they will be trapped in the filter and prevented from being exhausted from the device. Several of these particles will fall from the mesh and filter assembly into the discard collector.
9. Purified grinds are collected in the purified grinds collector and retrieved by the operator when the purification process is complete.
10. Discarded grinds can be retrieved when the discard collector is full, or as desired by the operator. These discarded grinds may be reused by the operator for making espresso like drinks, and should not be thought of as waste. The discarded particles are merely the remnants of the purification process and can be used for brewing coffee using other processes.

Integrations

A wireless or wired interface may be exposed from the Filtration device that allows other devices to communicate with the Filtration device. Important variables and parameters may be exchanged over these interfaces which allows the Filtration device to learn about its inputs. The Filtration device may also interface with other devices downstream and pass important variables and parameters to them. This section describes some of these integrations.

Grinder

A grinder may identify its make and model to the Filtration device over the interface exposed by the Filtration device. The grinder may also exchange information about the grind setting that was used to grind coffee beans. This information can be sent by the grinder to the Filtration device. The Filtration device may also request this information from the grinder.

Once the Filtration device knows the make/model of the grinder and the grind setting that was used to grind the coffee, it can infer the required parameters of operation to perform purification (like inlet and outlet fan settings, and hopper vibration motor settings, etc.) and no intervention may be required on the part of the operator to perform the purification process.

Additionally, there is the possibility of a physical integration with a grinder. It is possible to actually integrate an Filtration device with a grinder, such that after the coffee is ground, but before it is discharged and made available to the operator of the grinder, a purification process may be undertaken consistent with the principles and/or implementation described in this document.

Weight Scale

Once the coffee grinds are purified, the weight of the purified grinds is known to the Filtration device via a weigh sensor. This information can be sent to an external weight scale via an appropriate networking interface.

Kettle

The Filtration device can communicate critical or important water settings to a kettle. Once the coffee is purified, the Filtration device can send information to a kettle indicating a suggested brewing temperature. In a touchscreen or app enabled Filtration device, the user may provide the actual instance of a coffee product to the filtration device. The Filtration device may know in detail not only how the grinds were purified, but also the origin of the grinds and the nature of the roast. By having this kind of knowledge, it should be possible to suggest a brewing temperature with very strong accuracy. Such calculations will be performed on a remote server, and sent to the Filtration device, which can then choose to relay this information to the kettle.

Brewing Machine

Like in the case of the Kettle, the Filtration device can send critical brew criteria to a brewing machine, for brewing of the grinds that the Filtration device has purified. The Filtration device can also inform the brewing machine of all grind purification specific information, including but not limited to: the coffee product being purified and subsequently brewed, water temperature, suggested water mass, weight of purified grounds, suggested brewing time, etc.

Pod Devices

The Filtration device as described in this document can support pod devices, which take a coffee pod as their input and brew from the contents of that pod. Furthermore, given the richness of information in the software stack, it should be possible to refine the outcome brew to near optimal states, thereby making the pod brewing process. The Filtration device's purified grounds collector may be shaped into an alternative collector, such that all the purified grinds collect in a disposable coffee pod. This disposable coffee pod can be extracted from this modified collector, and placed for brewing directly into the appropriate pod brewing device. The Filtration device can also share a specific recipe to the pod brewing device, on the basis of the information at the end of the purification step.

Software and System Level Integrations

Figure 10:
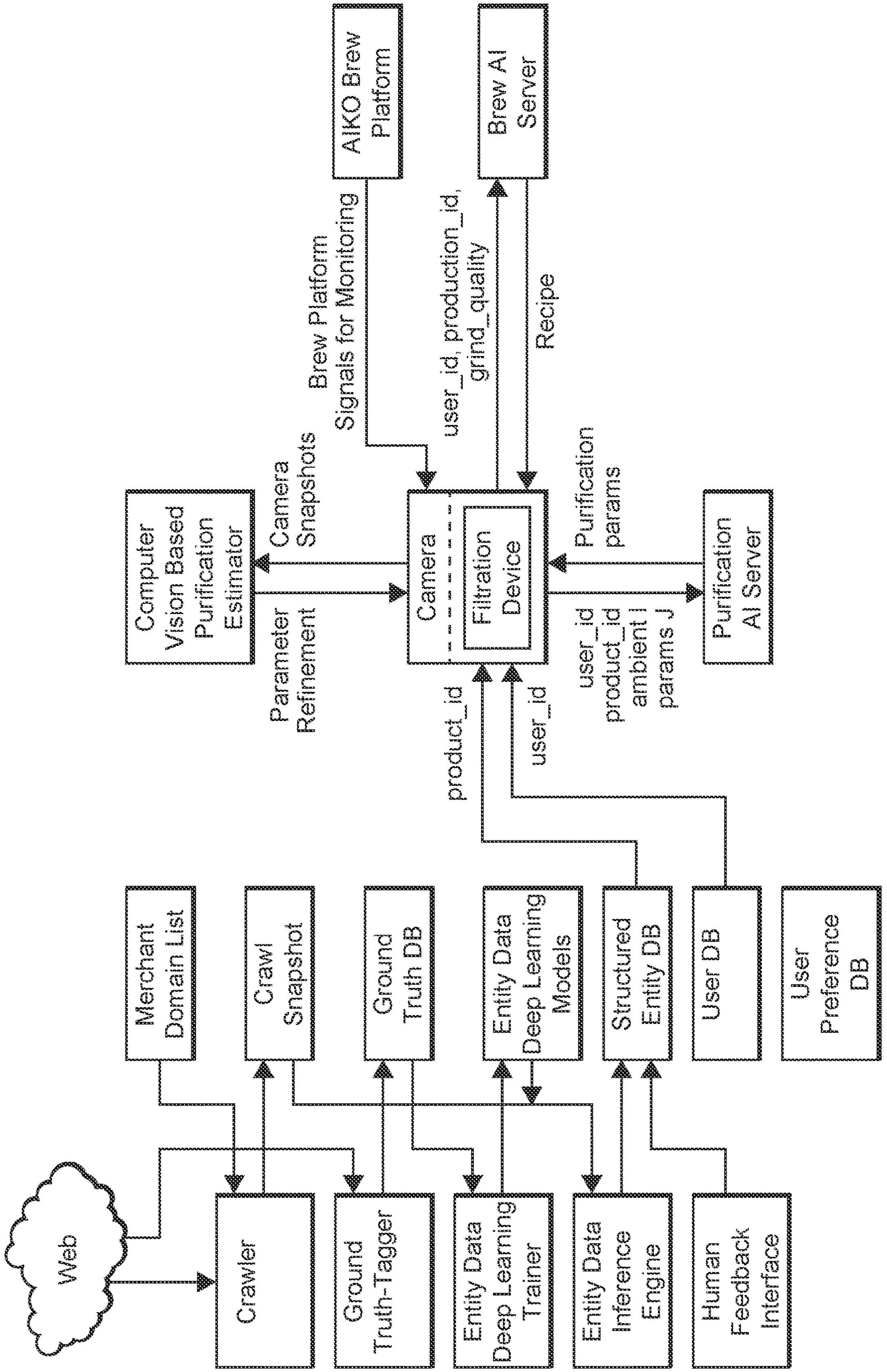
FIG. 10 is a schematic diagram illustrating hardware and software components of an ecosystem in which a filtration device may operate.

FIG. 10 illustrates a schematic diagram illustrating various hardware and software components of an ecosystem in which the filtration device described herein may operate

Coffee AI

The function of this set of systems may be used to construct a structured super-set of all coffee product information, for all coffee products on sale anywhere in the world.

Purification AI

Coffee beans of different origins have different physical characteristics including but not limited to size, color, density, etc. These characteristic differences in green coffee are further differentiated by the infinitely many variations that green coffee can be subjected to during the roast process. The same batch of green coffee, in the hands of different roasters with different roasting techniques and protocols may yield roasted coffee of different flavor profiles, colors and densities. The physical characteristics of coffee are very important in the grinding and brewing process, because the interaction of water against ground coffee has to obey a certain set of physics and chemistry constraints in order for the brewed drink to fulfill the promise of the roasted bean. Given the number of variables at play, it would be almost impossible for any human to account for these variables adequately to do justice to a randomly selected coffee product. This inherent complexity prevents consumers from enjoying a wide range of coffee, and thereby discovering the truly wide range of products available on the market. Many consumers, through a process of trial-and-error, dial in a specific origin of coffee, from a specific roaster, and brew it using a specific technique, which goes on to constitute their daily coffee habit. Unfortunately, this locks them out of the joy of experiencing the vast amount of innovative coffee farmers and roasters are continually putting out on the market. This lack of discovery further keeps consumers from realizing their true preferences about coffee. This lack of discovery and subsequent under-realization of preferences artificially constricts the market for coffee, which is an economic loss for all the participants in the coffee trade, all the way from farmers to end consumers.

Server-Side Purification

Software engineering and statistical modelling techniques are very well suited to modeling and solving problems of this nature of complexity. Once the user has identified the coffee product they wish to grind and consume, the entity identified will contain structured data to describe the nature and characteristics of the product.

At this stage the user who wants to prepare and consume the product has also been identified (through a logged-in presence on a mobile app, or the Filtration device), and the user's profile will contain information that informs the system about the user's preferences. Furthermore, various pieces of information can be derived from feedback the user has offered to the system from the past instances of coffee the user has prepared and consumed. This preference information in conjunction with the structured information in the coffee entity will be passed to a set of algorithms, which will construct a set of parameters to be passed onto the Filtration device for the process of purification.

The parameters of the purification process have direct implications on the nature of the brewed drink. Several brewed cups of coffee can be derived from the same batch of roasted coffee beans, conforming to different characteristics 'in-the-cup'. For instance, it might be possible to make a cup heavy-bodied and robust in flavor, at the expense of eliciting all the delicate flavor notes in the roasted bean. Alternately, extracting and showcasing the delicate flavors can be achieved at the expense of the brew's body, leading to a light, delicate, silky mouthfeel. These variations are predominantly achieved by first shaping the grind size distribution, which is one of the goals of the Filtration device.

On Device Purification

Some embodiments of the Filtration device are equipped with a camera sensor module. This module looks into the purified grinds collector, and can observe not only the grinds that have fallen into the purified grinds collector, but can also observe the grinds as they are discharged from the hopper and whilst in flight, either as they as blown away towards the outlet fan, or as they fall into the purified grinds collector.

This process of observation allows the Filtration device to look at the particles as they are being discarded and to make micro-optimizations to the device parameters to make the actual instance of the purification process more closely compliant with the expected purification process implied by the purification parameters sent by the server.

There are several ambient conditions which can cause the purification instance to deviate from the ideal. For instance, any degradation in the inlet filter can cause more air to pass through the inlet than ideal. Any degradation in the outlet filter by way of clogging can prevent the discharge of air through the outlet fan, and hence cause the outlet fan to exert less pressure than implied by its functional parameters. Ambient air pressure and temperature can also prevent the device from adhering to the ideal purification parameters. Observing the purification process in real-time and making adjustments to the device in real-time can help mitigate some of these phenomena.

Not all embodiments of the Filtration device need to be outfitted with a camera module. For the most part, unless detrimental degradations have taken place in the device's function, server-set parameters should create meaningful improvements in the grind size distribution effected by the Filtration device. Certain high-end consumer devices, or commercial devices which are subjected to heavy workloads may benefit from continual device-side monitoring and adjustments on a per-purification basis. Such devices are more likely to be outfitted with these camera modules. Even for devices which are outfitted with camera modules, the use of the camera module and its associated artificial intelligence capabilities may be subject to the operator/user purchasing premium access to these features.

Brew AI

Effecting corrections to the grind size distribution is the first step in ensuring a high-quality brew. The filtration device may not only to effect positive changes to the grind size distribution, but also assist the user in the brewing process, and provide all the technology and informational support possible to ensure a successful brew outcome. Once the grind size has been corrected by the Filtration device, the device or any visual interface associated with the device like a smartphone app, can be used to ask the user which brew technique the user is about to use for the grinds that have been purified. Most users use a finite and small number of brewing techniques on a regular basis, e.g. French Press, AeroPress, V60, Chemex or other filter style brewing techniques. Once the brewing technique is identified, algorithmic techniques will be used to calculate ideal brew variables like water volume, water temperature, etc., and these will be communicated to the user in the form of a 'recipe'.

The integration of a brew platform will allow the Filtration device to instrument and observe the brew process as it takes place, and provide corrective feedback to the user in real-time to compensate for deviations from the recipe. Once the brew is complete, the user will be asked for feedback on the qualitative outcome of the brew. This information is used to construct and fine-tune a user's preferences over time, leading to more accurate brew outcomes.

Although the disclosure may not expressly disclose that some embodiments or features described herein may be combined with other embodiments or features described herein, this disclosure should be read to describe any such combinations that would be practicable by one of ordinary skill in the art. Unless otherwise indicated herein, the term "include" shall mean "include, without limitation," and the term "or" shall mean non-exclusive "or" in the manner of "and/or."

Those skilled in the art will recognize that, in some embodiments, some of the operations described herein may be performed by human implementation, or through a combination of automated and manual means. When an operation is not fully automated, appropriate components of embodiments of the disclosure may, for example, receive the results of human performance of the operations rather than generate results through its own operational capabilities.

All references, articles, publications, patents, patent publications, and patent applications cited herein are incorporated by reference in their entireties for all purposes to the extent they are not inconsistent with embodiments of the disclosure expressly described herein. However, mention of any reference, article, publication, patent, patent publication, and patent application cited herein is not, and should not be taken as an acknowledgment or any form of suggestion that they constitute valid prior art or form part of the common general knowledge in any country in the world, or that they are disclose essential matter.

Several features and aspects of the present invention have been illustrated and described in detail with reference to particular embodiments by way of example only, and not by way of limitation. Those of skill in the art will appreciate that alternative implementations and various modifications to the disclosed embodiments are within the scope and contemplation of the present disclosure. Therefore, it is intended that the invention be considered as limited only by the scope of the appended claims.

What is claimed is:

1. A particle filter apparatus, comprising a chamber comprising an inlet fan enclosure defining a first zone and an outlet fan enclosure defining a second zone adjacent to the first zone;

an inlet fan operably connected to a first lateral side of the chamber and adjacent to the inlet fan enclosure to provide a flow of air into the chamber;

an outlet fan operably connected to a second lateral side of the chamber opposite the first lateral side and adjacent to the outlet fan enclosure to exhaust air from the chamber;

wherein the outlet fan enclosure overlaps and extends over the inlet fan enclosure and is separated by a gap to define an air inlet for the outlet fan;

a first collector operably connected to bottom surface of the chamber, the first collector mounted under the first zone of the chamber to collect particles introduced into the first zone of the chamber; and a controller configured to drive the inlet and outlet fans to expel non-conforming particles introduced into the chamber from the first zone before arriving in the first collector.

2. The particle filter apparatus of claim 1 further comprising a second collector operably connected to the bottom surface chamber and adjacent to the first collector, the second collector mounted under the second zone of the chamber, and wherein non-conforming particles evacuated from the first zone enter the second zone and collect in the second collector.

3. The particle filter apparatus of claim 1 further comprising a hopper connected to a top surface of the chamber and over the first zone.

4. The particle filter apparatus of claim 3 further comprising a vibration motor operably associated with and providing a vibration force to the hopper.

5. The particle filter apparatus of claim 1 further comprising a first air filter element disposed between the first inlet fan and the first zone of the chamber.

6. The particle filter apparatus of claim 5 further comprising a second air filter element disposed between the outlet fan and the second zone of the chamber.

7. The particle filter apparatus of claim 6 further comprising a mesh element disposed between the second zone of the chamber and the second air filter element.

8. The particle filter apparatus of claim 6 wherein the first or second air filter element is removable.

9. The particle filter apparatus of claim 1 wherein the controller is operative to vary the operating speed of the inlet fan and the outlet fan.

10. The particle filter apparatus of claim 1 wherein the first collector is removable.

11. The particle filter apparatus of claim 1 further comprising one or more pressure sensors operably interfaced to the first zone; and wherein the controller is operative to control operation of the inlet fan in response to pressure signals provided by the one or more pressure sensors.

12. The particle filter apparatus of claim 1 further comprising a weight sensor disposed under the first collector to sense the weight of filtered particles disposed therein.

13. The particle filter apparatus of claim 1 further comprising an air collimator element disposed between the inlet fan and the first zone.

14. The particle filter apparatus of claim 1 further comprising an ionizer disposed in the second zone and configured to impart an electrical charge to particles entering the second zone.

15. The particle filter apparatus of claim 1 further comprising a camera mounted to capture images within the chamber; and wherein the controller is configured to adjust operation of the inlet fan or the outlet fan based on analysis of the images provided by the camera.

16. A particle filter apparatus, comprising a chamber comprising a first enclosure defining a first zone and an outlet fan enclosure defining a second zone adjacent to the first zone;

a hopper connected to a top surface of the chamber above the first zone;

a first fan operably connected to a first lateral side of the chamber and adjacent to the outlet fan enclosure to exhaust air from the chamber;

wherein the outlet fan enclosure overlaps and extends over the first enclosure and is separated by a gap to define an air inlet for the outlet fan;

a first collector operably connected to bottom surface of the chamber, the first collector mounted under the first zone of the chamber to collect particles introduced into the chamber from the hopper; and a controller configured to drive the first fan to expel non-conforming particles introduced into the chamber from the hopper from the first zone before arriving in the first collector.

17. A particle filter apparatus, comprising a filtration chamber comprising an inlet fan enclosure defining a first zone and an outlet fan enclosure defining a second zone adjacent to the first zone;

an inlet fan operably connected to a first lateral side of the chamber and adjacent to the inlet fan enclosure to provide a flow of air into the filtration chamber;

an outlet fan operably connected to a second lateral side of the chamber opposite the first lateral side and adjacent to the outlet fan enclosure to exhaust air from the chamber;

wherein the outlet fan enclosure overlaps and extends over the inlet fan enclosure and is separated by a gap to define an air inlet for the outlet fan;

a hopper connected to a top surface of the chamber above the first zone;

an air filter/collimator element disposed between the inlet fan and the chamber to promote laminar flow of air across the filtration chamber;

a collector in fluid communication with a bottom of the chamber; and a control system to drive the one or more fans to expel non-conforming particles introduced into the chamber from the hopper before arriving in the collector.

* * * * *